US012570489B2

(12) United States Patent
Liu

(10) Patent No.: US 12,570,489 B2
(45) Date of Patent: Mar. 10, 2026

(54) WINDING AND UNWINDING APPARATUS, AND PREPARATION SYSTEM OF ELECTRODE PLATE

(71) Applicant: CONTEMPORARY AMPEREX TECHNOLOGY (HONG KONG) LIMITED, Hong Kong (CN)

(72) Inventor: Yu Liu, Fujian (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 213 days.

(21) Appl. No.: 18/368,582

(22) Filed: Sep. 15, 2023

(65) Prior Publication Data

US 2024/0076155 A1 Mar. 7, 2024

Related U.S. Application Data

(63) Continuation of application No. PCT/CN2023/092185, filed on May 5, 2023.

(30) Foreign Application Priority Data

Sep. 5, 2022 (CN) .......................... 202222344653.4

(51) Int. Cl.
*B65H 18/10* (2006.01)
*H01M 10/04* (2006.01)

(52) U.S. Cl.
CPC ...... *B65H 18/103* (2013.01); *H01M 10/0409* (2013.01); *B65H 2301/515* (2013.01); *B65H 2403/72* (2013.01); *B65H 2701/19* (2013.01)

(58) Field of Classification Search
CPC .. B65H 18/10; B65H 18/103; B65H 18/0212; B65H 2403/724
See application file for complete search history.

(56) References Cited

U.S. PATENT DOCUMENTS

| | | | | |
|---|---|---|---|---|
| 4,541,583 A | | 9/1985 | Forman et al. | |
| 7,264,193 B2 * | | 9/2007 | Hikita | B65H 19/283 |
| | | | | 242/527.2 |

FOREIGN PATENT DOCUMENTS

| | | |
|---|---|---|
| CN | 103950779 A | 7/2014 |
| CN | 204074697 U | 1/2015 |

(Continued)

OTHER PUBLICATIONS

International Search Report mailed on Jul. 27, 2023, received for PCT Application PCT/CN2023/092185, filed on May 5, 2023, 7 pages including English Translation.

*Primary Examiner* — Sang K Kim
(74) *Attorney, Agent, or Firm* — XSENSUS LLP

(57) ABSTRACT

This application relates to a winding and unwinding apparatus and a preparation system of electrode plate. The apparatus includes supports, a rotating shaft, a rotating turret, and a power assembly. The rotating shaft is rotatably disposed on the support. The rotating turret is disposed on the rotating shaft and capable of rotating along with the rotating shaft so as to switch between at least two target operation positions. The power assembly includes a first power source and a magnetic powder clutch. The rotating shaft and the first power source are in transmission connection with each other via the magnetic powder clutch. The magnetic powder clutch is configured to control the rotating shaft to remain stationary when the rotating turret is hovering at each target operation position.

11 Claims, 4 Drawing Sheets

(56)         References Cited

FOREIGN PATENT DOCUMENTS

| | | | |
|---|---|---|---|
| CN | 105035812 | A | 11/2015 |
| CN | 108438994 | A | 8/2018 |
| CN | 207876904 | U | 9/2018 |
| CN | 211687571 | U | 10/2020 |
| CN | 218261142 | U | 1/2023 |

* cited by examiner

WINDING AND UNWINDING APPARATUS, AND PREPARATION SYSTEM OF ELECTRODE PLATE

CROSS-REFERENCE TO RELATED APPLICATIONS

This application is a continuation of International Application No. PCT/CN2023/092185, filed May 5, 2023, which refers to Chinese Patent Application No. 202222344653.4, filed on Sep. 5, 2022 and entitled "WINDING AND UNWINDING APPARATUS, AND PREPARATION SYSTEM OF ELECTRODE PLATE", each of which is incorporated herein by reference in its entirety.

TECHNICAL FIELD

This application relates to the field of winding and unwinding technologies, and in particular, to a winding and unwinding apparatus, and a preparation system of electrode plate.

BACKGROUND

Winding and unwinding apparatuses refer to apparatuses that can be used for mounting a winding drum to wind/unwind materials on the winding drum, and the winding and unwinding apparatuses are widely used in fields of film preparation, coating, preparation of battery electrode plate, and the like.

When a winding drum of a winding and unwinding apparatus is loaded or unloaded, a rotating turret of the winding and unwinding apparatus needs to be rotated to and positioned at an operation position. For a winding and unwinding apparatus in the related art, when a rotating turret is positioned at an operation position, a problem of inaccurate positioning of the rotating turret is prone to occur.

SUMMARY

In view of the foregoing problem, this application provides a winding and unwinding apparatus, and a preparation system of electrode plate.

According to a first aspect, this application provides a winding and unwinding apparatus including supports, a rotating shaft, a rotating turret, and a power assembly. The rotating shaft is capable of being rotatably disposed on the support. The rotating turret is disposed on the rotating shaft and capable of rotating along with the rotating shaft so as to switch between at least two target operation positions, and the rotating turret is configured for mounting a winding drum. The power assembly is disposed on the support and includes a first power source and a magnetic powder clutch, where the rotating shaft and the first power source are in transmission connection with each other via the magnetic powder clutch, and the magnetic powder clutch is configured to control the rotating shaft to remain stationary when the rotating turret is hovering at each target operation position.

In technical solutions of embodiments of this application, when the rotating turret needs to be positioned at a target operation position, an excitation current of the magnetic powder clutch is simply switched to a magnitude sufficient for keeping the rotating shaft stationary without turning off a power supply of the first power source, thus avoiding the problem of inaccurate positioning of the rotating turret due to sliding of the rotating shaft caused by power outage of the first power source. In addition, it is possible to keep the rotating shaft balanced in a target position without the need for an additional electromagnetic lock mechanism, simplifying the structure and avoiding the problem of inaccurate positioning of the rotating turret due to shaking of the rotating turret caused by the electromagnetic lock mechanism.

In some embodiments, the winding and unwinding apparatus further includes a fastener and a positioning assembly, where the fastener is fixed to the rotating shaft, the positioning assembly is disposed on the support, and the positioning assembly is configured to be capable of switching between a first state and a second state. The positioning assembly in the first state is capable of avoiding the fastener. When the rotating shaft remains stationary, the positioning assembly is in the second state and is in non-rotatable connection with the fastener. In this case, when the rotating shaft remains stationary, the positioning assembly switches to the second state and is in non-rotatable connection with the fastener, and a position of the fastener is kept fixed to strengthen fixing of position of the rotating shaft and improve continuous reliability of positioning of the rotating shaft.

In some embodiments, the fastener has a positioning recess disposed in an axial direction of the rotating shaft, where when in the first state, the positioning assembly exits the positioning recess, and when in the second state, the positioning assembly extends into the positioning recess. In this case, the positioning recess is processed on the fastener so that the positioning assembly can move in and out of the positioning recess when switching between the first state and the second state, featuring simple structure and reliable positioning.

In some embodiments, the positioning assembly includes a fixing shaft and a second power source, where the second power source is in transmission connection with the fixing shaft for controlling movement of the fixing shaft along the axial direction of the rotating shaft; and when the positioning assembly is in the first state, the fixing shaft exits the positioning recess, and when the positioning assembly is in the second state, the fixing shaft extends into the positioning recess. In this case, the positioning assembly is formed by the fixing shaft and the second power source, featuring simple structure, easy implementation, and reliable positioning.

In some embodiments, the fastener is provided with a plurality of positioning recesses, where all the positioning recesses are arranged around the axial direction of the rotating shaft. In this case, provision of the plurality of positioning recesses can improve reliability of positioning.

In some embodiments, the target operation position is provided in two, and the two target operation positions are respectively located in two opposite radial directions of the rotating shaft. In this case, when the rotating turret switches from one target operation position to the other target operation position, the rotating shaft is simply rotated 180 degrees. In this way, control of the rotating turret is much simpler.

In some embodiments, the rotating turret includes a turret arm and a winding shaft, where the turret arm is fixedly connected to the rotating shaft, the winding shaft is configured for mounting the winding drum and disposed at the turret arm, and the winding shaft is parallel to the rotating shaft. In this case, the turret arm and the winding shaft can be combined to implement mounting of the winding drum.

In some embodiments, the rotating turret includes at least two turret arms, where all the turret arms are spaced apart along the axial direction of the rotating shaft, and the winding shaft is disposed between adjacent two of the turret arms. Provision of a plurality of turret arms can not only enhance structural strength of the rotating turret, but also increase mounting positions of winding shaft for more winding shafts to be mounted. More winding shafts lead to more winding drums mounted on the rotating turret, such that a plurality of materials can be wound and unwound simultaneously, improving utilization of the rotating turret.

In some embodiments, the winding shaft is provided in at least two, and all the winding shafts are arranged around the rotating shaft. In this case, the winding and unwinding apparatus can implement simultaneous multi-position operations, improving work efficiency of the winding and unwinding apparatus.

In some embodiments, the winding and unwinding apparatus includes two supports, where the two supports are spaced apart along the axial direction of the rotating shaft, and the rotating shaft is mounted between the two supports. In this case, the two supports and the rotating shaft form a gantry-type structure, and the winding and unwinding apparatus has good structural stability.

According to a second aspect, this application provides a preparation system of electrode plate, where the preparation system of electrode plate includes an unwinding device, a slitting device, and a winding device, the unwinding device, the slitting device, and the winding device being arranged in sequence along a material delivery path; where the unwinding device and/or the winding device includes the foregoing winding and unwinding apparatus.

In some embodiments, the preparation system of electrode plate further includes a rolling device, where the rolling device has clearance between rolls for the material to penetrate, and the rolling device is arranged between the unwinding device and the winding device on the material delivery path.

The foregoing description is merely an overview of the technical solutions of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. Moreover, throughout the accompanying drawings, like reference signs denote like components. In the accompanying drawings.

Figure 1:
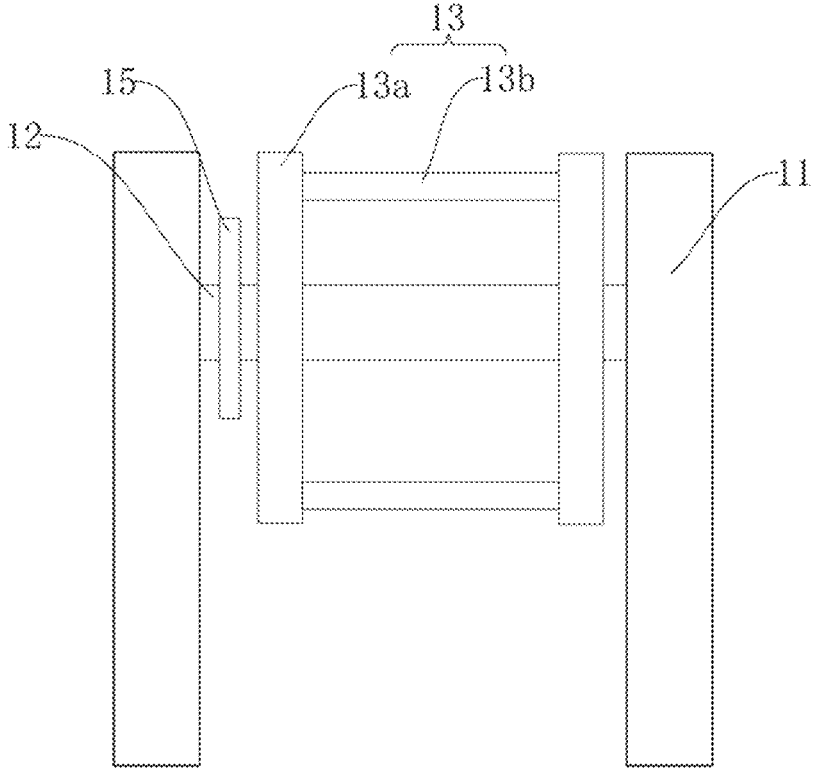
FIG. 1 is a schematic structural diagram of a winding and unwinding apparatus according to some embodiments of this application.

REFERENCE SIGNS IN THE SPECIFIC EMBODIMENTS ARE DESCRIBED AS FOLLOWS 1000. preparation system of electrode plate; 100. unwinding device; 200. slitting device; 300. winding device; 400. rolling device; 10. winding and unwinding apparatus; 11. support; 12. rotating shaft; 13. rotating turret; 13$a$. turret arm; 13$b$. winding shaft; 14. power assembly; 14$a$. first power source; 14$b$. magnetic powder clutch; b1. active rotor; b2. driven rotor; b3. magnetic powder space; 14$c$. transmission belt; 15. fastener; 15$a$. positioning recess; 15$b$. socket; 16. positioning assembly; 16$a$. fixing shaft; 16$c$. second power source; and 20. winding drum.

DESCRIPTION OF EMBODIMENTS

The following describes in detail the embodiments of the technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", "have", and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations.

Winding and unwinding apparatuses refer to apparatuses that can be used for mounting a winding drum to wind/unwind materials on the winding drum, and the winding and unwinding apparatuses are widely used in fields of film preparation, coating, preparation of battery electrode plate, and the like.

The inventors have found that when a winding drum of a winding and unwinding apparatus is loaded or unloaded, a rotating turret of the winding and unwinding apparatus needs to be rotated to and positioned at an operation position. In the related art, a winding and unwinding apparatus generally uses a combination of motor and reducer for providing torque to a rotating shaft so as to control a rotating turret to rotate (the rotating turret is mounted on the rotating shaft). When the rotating turret needs to be positioned at an operation position, a power supply of the motor needs to be cut off so that the reducer cannot drive the rotating shaft to rotate. Since the motor is powered off at this point and cannot output torque to the rotating shaft to keep the rotating shaft balanced, the rotating shaft is prone to sliding, resulting in inaccurate positioning of the rotating turret. In the related art, to resolve the inaccurate positioning of the rotating turret, the winding and unwinding apparatus further uses an electromagnetic lock mechanism to lock the rotating shaft to avoid imbalance of the rotating shaft after loss of torque, in which case the rotating turret is prone to shaking and the winding and unwinding apparatus features a complicated structure.

Based on the foregoing considerations, to solve the problem of inaccurate positioning of a rotating turret of a winding and unwinding apparatus, through in-depth research, the inventors have designed a winding and unwinding apparatus, and a preparation system of electrode plate. The apparatus includes supports, a rotating shaft, a rotating turret, and a power assembly. The rotating shaft is rotatably disposed on the support. The rotating turret is disposed on the rotating shaft and capable of rotating along with the rotating shaft so as to switch between at least two target operation positions, and the rotating turret is configured for mounting a winding drum. The power assembly includes a first power source and a magnetic powder clutch. The rotating shaft and the first power source are in transmission connection with each other via the magnetic powder clutch. The magnetic powder clutch is configured to control the rotating shaft to remain stationary when the rotating turret is hovering at each target operation position. In this case, when the rotating turret reaches a correct position, the magnetic powder clutch can continuously provide torque to the rotating shaft, ensuring that the rotating shaft does not slide and the rotating turret can be accurately positioned.

A winding and unwinding apparatus disclosed in the embodiments of this application may be used without limitation in production scenarios such as coating, film preparation, preparation of battery electrode plate, and roll-to-roll rolling, and also in other scenarios where materials need to be wound and unwound.

Figure 2:
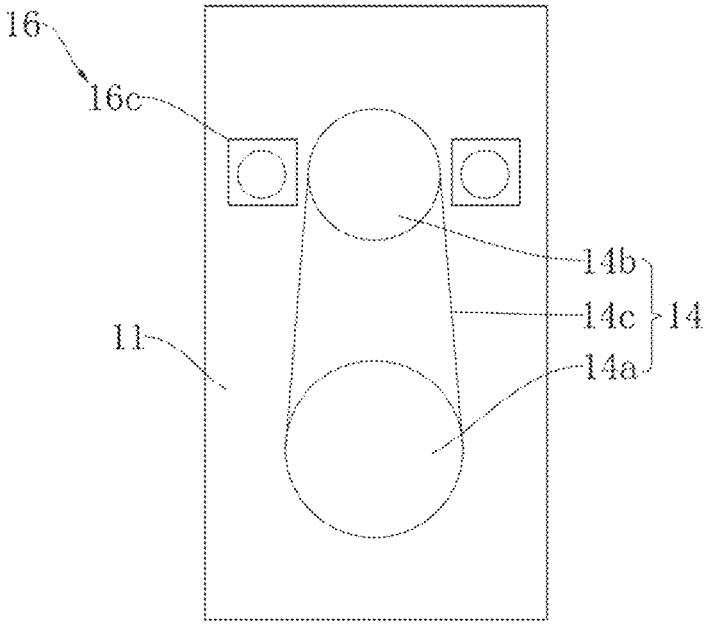
FIG. 2 is a left side view of the winding and unwinding apparatus shown in FIG. 1.

FIG. 1 is a schematic structural diagram of a winding and unwinding apparatus according to some embodiments of this application. FIG. 2 is a left side view of the winding and unwinding apparatus shown in FIG. 1.

According to some embodiments of this application, referring to FIG. 1 and FIG. 2, this application provides a winding and unwinding apparatus 10 including supports 11, a rotating shaft 12, a rotating turret 13, and a power assembly 14. The rotating shaft 12 is capable of being rotatably disposed on the support 11. The rotating turret 13 is disposed on the rotating shaft 12 and capable of rotating along with the rotating shaft 12 so as to switch between at least two target operation positions, and the rotating turret 13 is configured for mounting a winding drum 20. The power assembly 14 is disposed on the support 11 and includes a first power source 14a and a magnetic powder clutch 14b, where the rotating shaft 12 and the first power source 14a are in transmission connection with each other via the magnetic powder clutch 14b, and the magnetic powder clutch 14b is configured to control the rotating shaft 12 to remain stationary when the rotating turret 13 is hovering at each target operation position.

The supports 11 serve as a base of the winding and unwinding apparatus 10 for carrying the components and providing certain rotation space for the rotating turret 13. A specific structure of the support 11 is not limited in this application, which may be a gantry type, a single frame, a frame type, a box type, or the like, provided that the above effect can be achieved.

The rotating shaft 12 is rotatably disposed around its own axial direction on the support 11. The rotating shaft 12 may be a straight rod type, a curved rod type, or the like, which is not specifically limited. The rotating shaft 12 may be made of metal (such as aluminum alloy and iron alloy) or the like, in which case the rotating shaft 12 has high strength and can effectively support the rotating turret 13. The rotating shaft 12 may be mounted on the support 11 through a bearing, allowing smoother rotation of the rotating shaft 12.

The rotating turret 13 is configured for mounting the winding drum 20. The winding drum 20 may be wound with a material, in which case the rotating turret 13 is used for unwinding the material. The winding drum 20 may alternatively be not wound with a material and is to be wounded by the material, in which case the rotating turret 13 is used for winding the material. The material may be but is not limited to film, aluminum foil, copper foil, strip steel, and other types of strip materials that can be wound, which varies depending on specific application fields. This is not described in detail and limited herein.

The rotating turret 13 rotates around the rotating shaft 12 as the rotating shaft 12 rotates, and during rotation, the rotating turret 13 switches between its target operation positions. The target operation position of the rotating turret 13 may be a loading and unloading position, a winding and unwinding position, a detection position, or the like. The loading and unloading position refers to an operation position for the winding drum 20 to be loaded or unloaded on the rotating turret 13. The winding and unwinding position refers to an operation position for winding and unwinding of materials after mounting of the winding drum 20 by the rotating turret 13. The detection position may refer to an operation position for measuring thickness of a material or detecting a position of a material in an axial direction of the winding drum 20. Certainly, operation positions for other purposes may be further provided based on actual needs. Functions of the target operation positions are not specifically limited in this application.

The first power source 14a can provide torque to the magnetic powder clutch 14b, and the magnetic powder clutch 14b is configured to output the torque provided by the first power source 14a to the rotating shaft 12. The first power source 14a may be but is not limited to a rotary motor, and any power apparatus capable of outputting torque can be used as the first power source 14a. A structure of the first power source 14a is not described in detail herein and can be conventionally arranged by persons skilled in the art.

Figure 6:
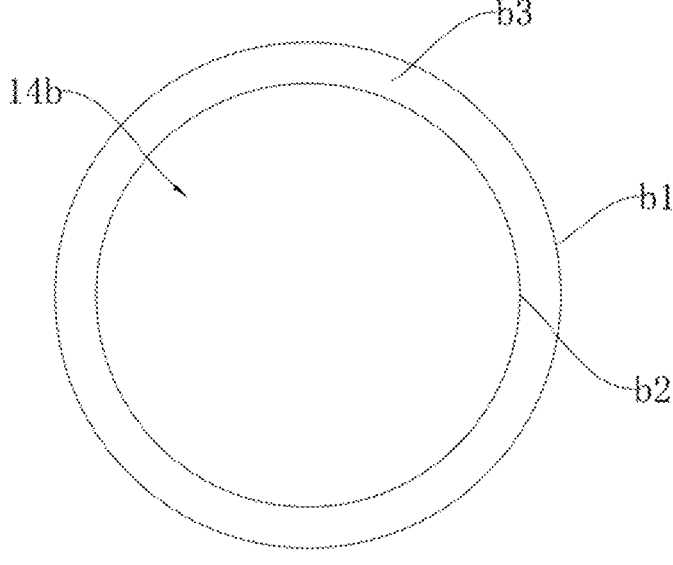
FIG. 6 is a schematic structural diagram of a magnetic powder clutch according to some embodiments of this application.

The magnetic powder clutch 14b is a device that transfers torque according to an electromagnetic principle and using magnetic powder, has an excitation current having a basically linear relationship with transferred torque, can transfer certain torque in case of no slip, and has advantages such as fast response, simple structure, zero pollution, zero noise, zero vibration under impact, and energy saving. It can be understood that, as shown in FIG. 6, the magnetic powder clutch 14b includes an active rotor b1 and a driven rotor b2 arranged coaxially, where the active rotor b1 is in transmission connection with the first power source 14a, and the driven rotor b2 is fixedly connected to the rotating shaft 12. Both the active rotor b1 and the driven rotor b2 are conventional components of the magnetic powder clutch 14b in the art, which are not limited to specific constructions herein. A magnetic powder space b3 is formed between the active rotor b1 and the driven rotor b2, and the magnetic powder space b3 is filled with magnetic powder. Power of the first power source 14a is transferred to the active rotor b1, torque of the active rotor b1 is transferred to the driven rotor b2 through the magnetic powder, and the driven rotor b2 drives the rotating shaft 12 to rotate. Specifically, the power assembly 14 may further include a transmission belt 14c, and the active rotor b1 and the first power source 14a are in transmission connection with each other via the transmission belt 14c. For a working principle of the magnetic powder clutch 14b, refer to common knowledge in the art. This is not specifically described herein.

For the magnetic powder clutch 14b, magnitude of torque output by the magnetic powder clutch 14b can be easily controlled by simply changing magnitude of the excitation current of the magnetic powder clutch 14b, so that the excitation current of the magnetic powder clutch 14b can be reduced to a magnitude sufficient for keeping the rotating shaft 12 at a position when the rotating turret 13 is hovering at any target operation position without turning off a power supply of the first power source 14a.

In this case, when the rotating turret 13 needs to be positioned at a target operation position, the excitation current of the magnetic powder clutch 14b is simply switched to a magnitude sufficient for keeping the rotating shaft 12 stationary without turning off the power supply of the first power source 14a, thus avoiding the problem of inaccurate positioning of the rotating turret 13 due to sliding of the rotating shaft 12 caused by power outage of the first power source 14a. In addition, it is possible to keep the rotating shaft 12 balanced in a target position without the need for an additional electromagnetic lock mechanism, simplifying the structure and avoiding the problem of inaccurate positioning of the rotating turret 13 due to shaking of the rotating turret 13 caused by the electromagnetic lock mechanism.

Figure 3:
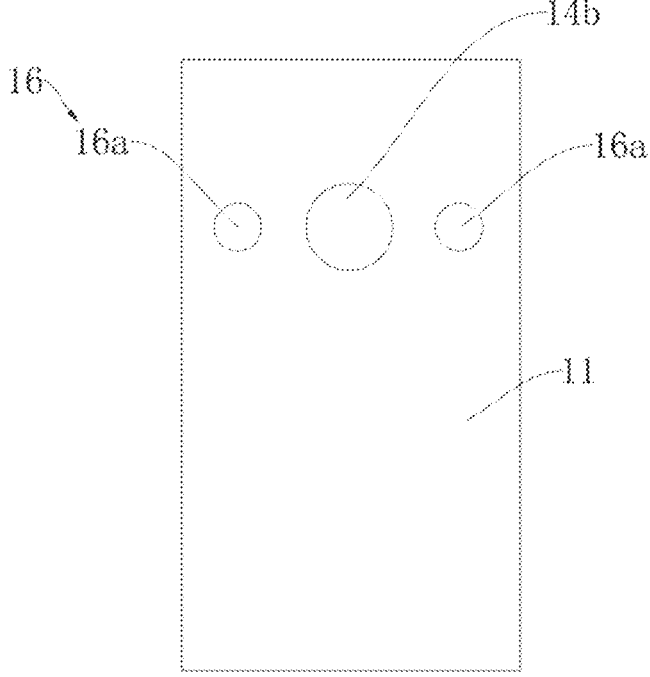
FIG. 3 is a right side view of a support portion of the winding and unwinding apparatus shown in FIG. 1.
Figure 4:
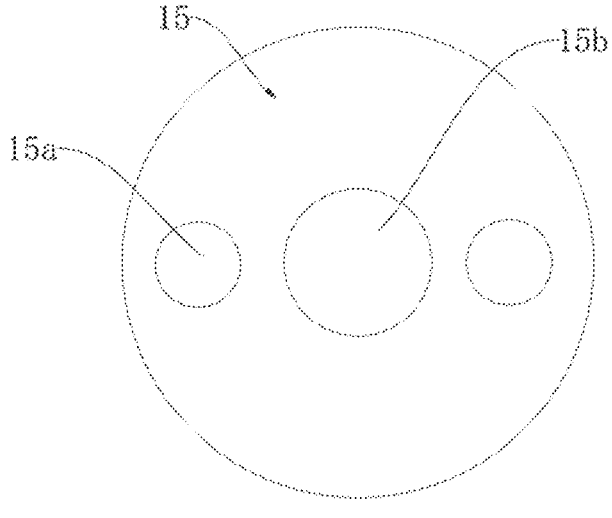
FIG. 4 is a schematic structural diagram of a fastener according to some embodiments of this application.
Figure 5:
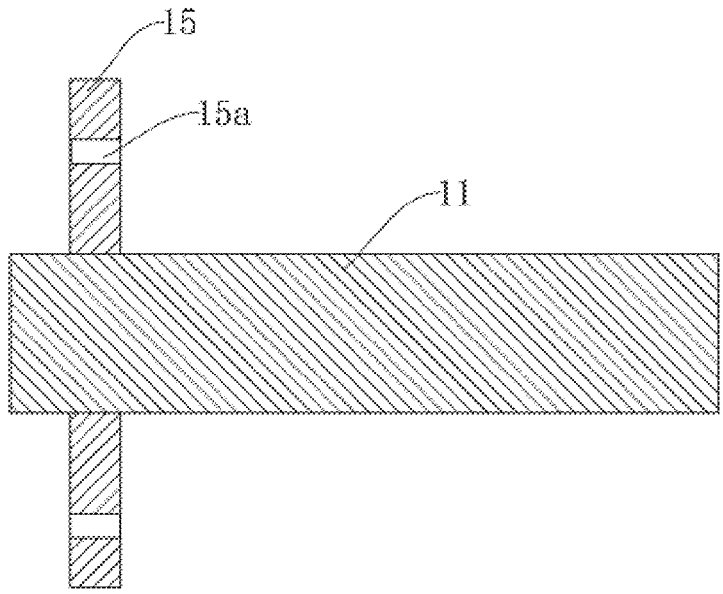
FIG. 5 is a schematic diagram of assembly of a fastener and a rotating shaft according to some embodiments of this application.

FIG. 3 is a right side view of a support 11 portion of the winding and unwinding apparatus 10 shown in FIG. 1. FIG. 4 is a schematic structural diagram of a fastener 15 according to some embodiments of this application. FIG. 5 is a schematic diagram of assembly of a fastener 15 and a rotating shaft 12 according to some embodiments of this application.

In some embodiments, referring to FIG. 3, FIG. 4, and FIG. 5, the winding and unwinding apparatus 10 further includes a fastener 15 and a positioning assembly 16, where the fastener 15 is fixed to the rotating shaft 12, the positioning assembly 16 is disposed on the support 11, and the positioning assembly 16 is configured to be capable of switching between a first state and a second state. The positioning assembly 16 in the first state is capable of avoiding the fastener 15. When the rotating shaft 12 remains stationary, the positioning assembly 16 is in the second state and is in non-rotatable connection with the fastener 15.

The fastener 15 may be a fastening disc, a fastening block, a fastening member 15, or the like, which is not limited to any specific shape. When the fastener 15 is a fastening disc, it has a disc-shape structure and its thickness direction may be parallel to an axial direction of the rotating shaft 12. The fastener 15 is fixedly disposed on the rotating shaft 12 and capable of rotating along with the rotating shaft 12, and when the rotating shaft 12 remains stationary, the fastener 15 remains stationary. The fastener 15 and the rotating shaft 12 may be fixed in a manner such as socketing, snap-fitting, welding, and fastening connection, which is not specifically limited. In an example, the fastener 15 has a socket 15b fitting the rotating shaft 12, and the fastener 15 is fixed to the rotating shaft 12 through the socket 15b.

The positioning assembly 16 is disposed on the support 11 and capable of switching between the first state and the second state relative to the support 11. The positioning assembly 16 may be but is not limited to a telescopic shaft and a clamping structure. When the positioning assembly 16 is a telescopic shaft, the telescopic shaft of the positioning assembly 16 in the first state is retracted relative to the support 11 to avoid the fastener 15, and the telescopic shaft of the positioning assembly 16 in the second state extends relative to the support 11 to be in non-rotatable connection with the fastener 15. When the positioning assembly 16 is a clamping structure, the clamping structure of the positioning assembly 16 in the first state is open relative to the support 11 to avoid the fastener 15, and the clamping structure of the positioning assembly 16 in the second state is closed relative to the support 11 to clamp the fastener 15. Certainly, a specific construction of the positioning assembly 16 is not limited to the above manners.

The positioning assembly 16 being in non-rotatable connection with the fastener 15 means that the fastener 15 rotates under the restriction of the positioning assembly 16, and when the fastener 15 cannot rotate, the rotating shaft 12 cannot rotate either.

In this case, when the rotating shaft 12 remains stationary, the positioning assembly 16 switches to the second state and is in non-rotatable connection with the fastener 15, and a position of the fastener 15 is kept fixed to strengthen fixing of position of the rotating shaft 12 and improve continuous reliability of positioning of the rotating shaft 12.

In some embodiments, still referring to FIG. 4, the fastener 15 has a positioning recess 15*a* disposed in the axial direction of the rotating shaft 12, where when in the first state, the positioning assembly 16 exits the positioning recess 15*a*, and when in the second state, the positioning assembly 16 extends into the positioning recess 15*a*.

The positioning recess 15*a* may be a positioning hole or a positioning slot, and the positioning recess 15*a* may be circular, rectangular, cross-shaped, triangular, or of another special shape. When the positioning assembly 16 is in the first state, the positioning assembly 16 exits the positioning recess 15*a*, in which case the fastener 15 is not restricted by the positioning assembly 16 and the rotating shaft 12 can rotate, allowing the rotating turret 13 to switch between the target operation positions. When the positioning assembly 16 is in the second state, the positioning assembly 16 extends into the positioning recess 15*a*, in which case the fastener 15 cannot rotate under the restriction of the positioning assembly 16 and therefore makes the rotating shaft 12 non-rotatable, helping ensure that the rotating shaft 12 remains at a position without moving.

In this case, the positioning recess 15*a* is processed on the fastener 15 so that the positioning assembly 16 can move in and out of the positioning recess 15*a* when switching between the first state and the second state, featuring simple structure and reliable positioning.

In some embodiments, still referring to FIG. 2 and FIG. 3, the positioning assembly 16 includes a fixing shaft 16*a* and a second power source 16*c*, where the second power source 16*c* is in transmission connection with the fixing shaft 16*a* for controlling movement of the fixing shaft 16*a* along the axial direction of the rotating shaft 12. When the positioning assembly 16 is in the first state, the fixing shaft 16*a* exits the positioning recess 15*a*, and when the positioning assembly 16 is in the second state, the fixing shaft 16*a* extends into the positioning recess 15*a*.

The second power source 16*c* may be a cylinder, a hydraulic cylinder, or the like that is capable of controlling movement of the fixing shaft 16*a*. A specific construction of the second power source 16*c* is not limited herein.

During actual operation, when the rotating shaft 12 rotates to a target position under the action of the magnetic powder clutch 14*b*, the second power source 16*c* drives the fixing shaft 16*a* to move along the axial direction of the rotating shaft 12 to a position where the fixing shaft 16*a* extends into the positioning recess 15*a*, improving fixing of position of the rotating shaft 12.

In this case, the positioning assembly 16 is formed by the fixing shaft 16*a* and the second power source 16*c*, featuring simple structure, easy implementation, and reliable positioning.

In some embodiments, referring to FIG. 4, the fastener 15 is provided with a plurality of positioning recesses 15*a*, where all the positioning recesses 15*a* are arranged around the axial direction of the rotating shaft 12.

When the rotating shaft 12 rotates to a target position, the positioning assembly 16 may be in non-rotatable connection with at least one of the positioning recesses 15*a*. Possibly, when the rotating turret 13 is at different target operation positions, the positioning assembly 16 is in non-rotatable connection with different positioning recesses 15*a*.

In this case, provision of the plurality of positioning recesses 15*a* can improve reliability of positioning.

In some embodiments, the target operation position is provided in two, and the two target operation positions are respectively located in two opposite radial directions of the rotating shaft 12.

The two opposite radial directions refer to two directions that are centered on the axial direction of the rotating shaft 12, are collinear, and extend in opposite directions. When the target operation position is provided in two, one target operation position may be a loading and unloading position, and the other target operation position may be a winding and unwinding position.

In this case, when the rotating turret 13 switches from one target operation position to the other target operation position, the rotating shaft 12 is simply rotated 180 degrees. In this way, control of the rotating turret 13 is much simpler.

In some embodiments, referring to FIG. 1, the rotating turret 13 includes a turret arm 13*a* and a winding shaft 13*b*, where the turret arm 13*a* is fixedly connected to the rotating shaft 12, the winding shaft 13*b* is configured for mounting the winding drum 20 and disposed at the turret arm 13*a*, and the winding shaft 13*b* is parallel to the rotating shaft 12.

The winding shaft 13*b* is configured for mounting the winding drum 20. Possibly, when the winding drum 20 is mounted on the winding shaft 13*b*, the winding drum 20 can rotate relative to the winding shaft 13*b* and the winding shaft 13*b* is fixed relative to the turret arm 13*a*, or relative positions between the winding drum 20 and the winding shaft 13*b* remain unchanged and the winding shaft 13*b* is rotatable relative to the turret arm 13*a*. In this way, winding and/or unwinding of materials by the winding drum 20 can be implemented.

Further possibly, the winding and unwinding apparatus 10 further includes a third power source, where the third power source may be in transmission connection with the winding drum 20 to drive the winding drum 20 to rotate relative to the winding shaft 13*b*, or the third power source is in transmission connection with the winding shaft 13*b* so as to drive the winding drum 20 to rotate through rotation of the winding shaft 13*b*. When rotating, the winding drum 20 can accelerate winding and unwinding of materials. The third power source may be but is not limited to a rotary motor.

In this case, the turret arm 13*a* and the winding shaft 13*b* can be combined to implement mounting of the winding drum 20.

Further possibly, the winding shaft 13*b* is removably mounted on the turret arm 13*a*. When the winding drum 20 needs to be loaded or unloaded, the winding shaft 13*b* can be removed, facilitating mounting of the winding drum 20.

In some embodiments, referring to FIG. 1, the rotating turret 13 includes at least two turret arms 13*a*, where all the turret arms 13*a* are spaced apart along the axial direction of the rotating shaft 12, and the winding shaft 13*b* is disposed between adjacent two of the turret arms 13*a*.

Provision of a plurality of turret arms 13*a* can not only enhance structural strength of the rotating turret 13, but also increase mounting positions of winding shaft 13*b* for more winding shafts 13*b* to be mounted. More winding shafts 13*b* lead to more winding drums 20 mounted on the rotating turret 13, such that a plurality of materials can be wound and unwound simultaneously, improving utilization of the rotating turret 13.

In some embodiments, referring to FIG. 1, the winding shaft 13*b* is provided in at least two, and all the winding shafts 13*b* are arranged around the rotating shaft 12.

When a plurality of winding shafts 13*b* are arranged around the rotating shaft 12, if one winding shaft 13*b* is at one target operation position, another winding shaft 13*b* may be at another target operation position. For example, if one winding shaft 13b is at a loading and unloading position and another winding shaft 13b is at a winding and unwinding position, loading and unloading of one winding drum 20 and winding and unwinding of a material on another winding drum 20 can be performed simultaneously on the rotating turret 13.

In this case, the winding and unwinding apparatus 10 can implement simultaneous multi-position operations, improving work efficiency of the winding and unwinding apparatus 10.

In some embodiments, referring to FIG. 1, the winding and unwinding apparatus 10 includes two supports 11, where the two supports 11 are spaced apart along the axial direction of the rotating shaft 12, and the rotating shaft 12 is mounted between the two supports 11. In this case, the two supports 11 and the rotating shaft 12 form a gantry-type structure, and the winding and unwinding apparatus 10 has good structural stability.

It can be understood that the power assembly 14 may be mounted on one of the supports 11.

In an embodiment of this application, a winding and unwinding apparatus includes a rotating shaft 12, supports 11, a rotating turret 13, a power assembly 14, a fastener 15, and a positioning assembly 16. The rotating shaft 12 is capable of being rotatably disposed on the support 11. The rotating turret 13 is disposed on the rotating shaft 12 and capable of rotating along with the rotating shaft 12 so as to switch between at least two target operation positions, and the rotating turret 13 is configured for mounting a winding drum 20. The power assembly 14 includes a first power source 14a and a magnetic powder clutch 14b, where the rotating shaft 12 and the first power source 14a are in transmission connection with each other via the magnetic powder clutch 14b, and the magnetic powder clutch 14b is configured to control the rotating shaft 12 to remain stationary when the rotating turret 13 is hovering at each target operation position. The positioning assembly 16 includes a fixing shaft 16a and a second power source 16c. The fastener 15 is disposed on the rotating shaft 12 and has a positioning recess 15a. The positioning assembly 16 is configured to be capable of switching between a first state and a second state, where when the positioning assembly 16 is in the first state, the fixing shaft 16a exits the positioning recess 15a; and when the positioning assembly 16 is in the second state, the fixing shaft 16a extends into the positioning recess 15a.

Figure 7:
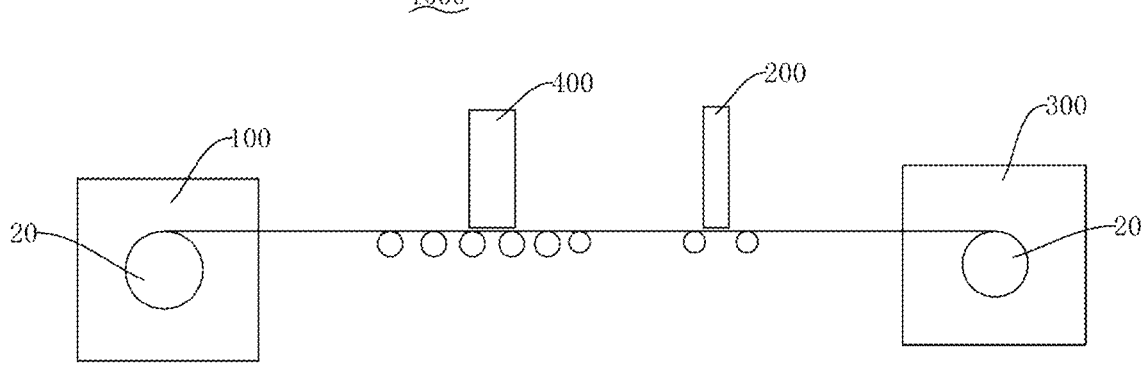
FIG. 7 is a schematic diagram of a preparation system of electrode plate according to some embodiments of this application.

According to a second aspect, referring to FIG. 7, an embodiment of this application further provides a preparation system 1000 of electrode plate, where the preparation system 1000 of electrode plate includes an unwinding device 100, a slitting device 200, and a winding device 300, the unwinding device 100, the slitting device 200, and the winding device 300 being arranged in sequence along a material delivery path; where the unwinding device 100 and/or the winding device includes the foregoing winding and unwinding apparatus 10.

The unwinding device 100 is a device for unwinding materials, and the winding device 300 is a device for winding materials. When delivered from the unwinding device 100 to the winding device 300, a material passes through the slitting device 200. The slitting device 200 is configured to slit the material, and possibly, the material is divided, by slitting along an extension direction of the material, into two sections of sub-materials. The sub-materials formed by slitting are ultimately wound in the winding device 300. The slitting device 200 is a device commonly used in the art, a specific construction of which is not limited herein.

The material may be copper foil, aluminum foil, or the like that is used for preparing a current collector of an electrode plate, which is not specifically limited.

Since the winding device 300 and/or unwinding device 100 in the preparation system 1000 of electrode plate includes the foregoing winding and unwinding apparatus 10, the specific beneficial effects of the foregoing winding and unwinding apparatus 10 are not described in detail herein again.

In some embodiments, still referring to FIG. 7, the preparation system 1000 of electrode plate further includes a rolling device 400, where the rolling device 400 has clearance between rolls for the material to penetrate, and the rolling device 400 is arranged between the unwinding device 100 and the winding device 300 on the material delivery path.

The rolling device 400 is a device for compacting an active material applied on the material. The rolling device 400 is a device commonly used in the art, a specific structure of which is not limited herein. For example, the rolling device 400 includes a base roll and an active roll, where the active roll is connected to a power source and rotates under the action of the power source, and clearance is left between the base roll and the active roll. When a material is fastened to the clearance, the active roll drives the base roll to rotate via the material and compacts the material.

In this case, rolling and slitting are integrated, and the preparation system 1000 of electrode plate is highly integrated with more comprehensive functions.

The rolling device 400 may be arranged upstream of the slitting device 200 such that rolling is performed before slitting of the material with no need for separate rolling of the sub-materials, featuring higher efficiency. Certainly, in other embodiments, the rolling device 400 may also be arranged downstream of the slitting device 200, and one rolling device 400 is simply arranged for each sub-material.

In addition, the preparation system 1000 of electrode plate may further include a coating device, where the coating device is arranged upstream of the rolling device 400. When a material passes through the coating device, the coating device applies an active material onto a surface of the material. Both the coating device and the active material may be used with conventional devices in the art, which is not limited herein. Technical features in the foregoing embodiments may be combined in any way. For brevity of description, possible combinations of the technical features in the foregoing embodiments are not described all. However, as long as there is no contradiction among combinations of these technical features, all the combinations should be considered within a range recorded in this specification.

The foregoing embodiments only represent several implementations of this application, and descriptions thereof are specific and detailed, but should not be construed as any limitations on the patent scope of this application. It should be noted that persons of ordinary skill in the art may further make several modifications and improvements without departing from the concept of this application, and these modifications and improvements also fall within the protection scope of this application. Therefore, the protection scope of this application should be subject to the appended claims.

The invention claimed is:

1. A winding and unwinding apparatus, comprising:
   a support;

a rotating shaft capable of being rotatably disposed on the support;

a rotating turret disposed on the rotating shaft and capable of rotating along with the rotating shaft so as to switch between at least two target operation positions, wherein the rotating turret is configured for mounting a winding drum; and a power assembly disposed on the support and comprising a first power source and a magnetic powder clutch, wherein the rotating shaft and the first power source are in transmission connection with each other via the magnetic powder clutch, and the magnetic powder clutch is configured to control the rotating shaft to remain stationary when the rotating turret is hovering at each target operation position, wherein the winding and unwinding apparatus further comprises a fastener and a positioning assembly, the fastener being fixed to the rotating shaft, the positioning assembly being disposed on the support, and the positioning assembly being configured to be capable of switching between a first state and a second state; wherein the positioning assembly in the first state is capable of avoiding the fastener; and when the rotating shaft remains stationary, the positioning assembly is in the second state and is in non-rotatable connection with the fastener.

2. The winding and unwinding apparatus according to claim 1, wherein the fastener has a positioning recess disposed in an axial direction of the rotating shaft; and when in the first state, the positioning assembly exits the positioning recess, and when in the second state, the positioning assembly extends into the positioning recess.

3. The winding and unwinding apparatus according to claim 2, wherein the positioning assembly comprises a fixing shaft and a second power source, the second power source being in transmission connection with the fixing shaft for controlling movement of the fixing shaft along the axial direction of the rotating shaft; wherein when the positioning assembly is in the first state, the fixing shaft exits the positioning recess, and when the positioning assembly is in the second state, the fixing shaft extends into the positioning recess.

4. The winding and unwinding apparatus according to claim 2, wherein the fastener is provided with a plurality of positioning recesses, all the positioning recesses being arranged around the axial direction of the rotating shaft.

5. The winding and unwinding apparatus according to claim 1, wherein the target operation position is provided in two, and the two target operation positions are respectively located in two opposite radial directions of the rotating shaft.

6. The winding and unwinding apparatus according to claim 1, wherein the rotating turret comprises a turret arm and a winding shaft, the turret arm being fixedly connected to the rotating shaft, the winding shaft being configured for mounting the winding drum and disposed at the turret arm, and the winding shaft being parallel to the rotating shaft.

7. The winding and unwinding apparatus according to claim 6, wherein the rotating turret comprises at least two turret arms, all the turret arms being spaced apart along an axial direction of the rotating shaft, and the winding shaft being disposed between adjacent two of the turret arms.

8. The winding and unwinding apparatus according to claim 6, wherein the winding shaft is provided in at least two, and all the winding shafts are arranged around the rotating shaft.

9. The winding and unwinding apparatus according to claim 1, wherein the winding and unwinding apparatus comprises two supports, the two supports being spaced apart along an axial direction of the rotating shaft; and the rotating shaft is mounted between the two supports.

10. A preparation system of electrode plate, wherein the preparation system of electrode plate comprises an unwinding device, a slitting device, and a winding device, the unwinding device, the slitting device, and the winding device being arranged in sequence along a material delivery path;

wherein the unwinding device and/or the winding device comprises the winding and unwinding apparatus according to claim 1.

11. The preparation system of electrode plate according to claim 10, wherein the preparation system of electrode plate further comprises a rolling device, the rolling device having clearance between rolls for the material to penetrate, and the rolling device being arranged between the unwinding device and the winding device on the material delivery path.

* * * * *